(12) United States Patent
Malik et al.

(10) Patent No.: US 9,519,908 B2
(45) Date of Patent: Dec. 13, 2016

(54) METHODS AND SYSTEMS FOR DYNAMIC COUPON ISSUANCE

(75) Inventors: Raza Ali Malik, San Jose, CA (US); Scott Bruck, San Jose, CA (US)

(73) Assignee: eBay Inc., San Jose, CA (US)

( * ) Notice: Subject to any disclaimer, the term of this patent is extended or adjusted under 35 U.S.C. 154(b) by 1999 days.

(21) Appl. No.: 12/610,057

(22) Filed: Oct. 30, 2009

(65) Prior Publication Data
US 2011/0106605 A1  May 5, 2011

(51) Int. Cl.
*G06Q 30/02* (2012.01)

(52) U.S. Cl.
CPC .......... *G06Q 30/02* (2013.01); *G06Q 30/0222* (2013.01); *G06Q 30/0224* (2013.01); *G06Q 30/0255* (2013.01)

(58) Field of Classification Search
None
See application file for complete search history.

(56) References Cited

U.S. PATENT DOCUMENTS

| | | | |
|---|---|---|---|
| 5,832,457 | A | 11/1998 | O'Brien et al. |
| 6,298,329 | B1 | 10/2001 | Walker et al. |
| 6,766,301 | B1 | 7/2004 | Daniel et al. |
| 7,107,226 | B1 | 9/2006 | Cassidy et al. |
| 7,565,367 | B2 | 7/2009 | Barrett et al. |
| 7,603,360 | B2 | 10/2009 | Ramer et al. |
| 7,980,466 | B2 | 7/2011 | Lee et al. |
| 8,370,336 | B2 | 2/2013 | Dumon et al. |
| 8,459,551 | B2 | 6/2013 | Lee et al. |
| 2001/0037206 | A1 | 11/2001 | Falk et al. |
| 2002/0188503 | A1 | 12/2002 | Banerjee et al. |
| 2003/0069737 | A1 | 4/2003 | Koubenski et al. |
| 2003/0135490 | A1 | 7/2003 | Barrett et al. |
| 2003/0212595 | A1 | 11/2003 | Antonucci |
| 2003/0229544 | A1 | 12/2003 | Veres |
| 2004/0019494 | A1 | 1/2004 | Ridgeway et al. |

(Continued)

FOREIGN PATENT DOCUMENTS

WO    WO-2010118167 A1    10/2010

OTHER PUBLICATIONS

U.S. Appl. No. 11/643,577, Final Office Action mailed Jan. 14, 2011, 16 pgs.

(Continued)

*Primary Examiner* — David Stoltenberg
(74) *Attorney, Agent, or Firm* — Schwegman Lundberg & Woessner, P.A.

(57) ABSTRACT

Methods and systems for issuing targeted coupons with a network-based system is disclosed. For example, a system can include a targeting module, a coupon rules engine, a coupon generation engine, a coupon widget, and a checkout module. The targeting module can create a model for controlling coupon generation. The coupon rules engine can determine whether a user accessing the network-based system qualifies to receive a coupon based at least in part on application of the model created by the targeting module. The coupon generation engine can generate a coupon based on the coupon rules engine determining that the user qualifies to receive a coupon. The coupon widget can present the coupon to the user while the user is accessing the network-based system. Finally, the checkout module can apply the coupon to a purchase by the user.

30 Claims, 10 Drawing Sheets

(56) References Cited

U.S. PATENT DOCUMENTS

| | | |
|---|---|---|
| 2004/0138953 A1 | 7/2004 | Van Luchene et al. |
| 2004/0177009 A1 | 9/2004 | Schrenk |
| 2005/0114229 A1 | 5/2005 | Ackley et al. |
| 2005/0144066 A1* | 6/2005 | Cope et al. ............ 705/14 |
| 2005/0144074 A1 | 6/2005 | Fredregill et al. |
| 2005/0240512 A1 | 10/2005 | Quintero et al. |
| 2005/0246332 A1 | 11/2005 | Wang et al. |
| 2006/0015405 A1 | 1/2006 | Bala et al. |
| 2006/0149681 A1 | 7/2006 | Meisner |
| 2006/0178918 A1* | 8/2006 | Mikurak ............ 705/7 |
| 2006/0190331 A1 | 8/2006 | Tollinger et al. |
| 2006/0265281 A1 | 11/2006 | Sprovieri et al. |
| 2007/0027856 A1 | 2/2007 | Lee |
| 2007/0033531 A1 | 2/2007 | Marsh |
| 2007/0150339 A1 | 6/2007 | Retter et al. |
| 2007/0150470 A1 | 6/2007 | Brave et al. |
| 2007/0174259 A1 | 7/2007 | Amjadi |
| 2007/0179849 A1 | 8/2007 | Jain |
| 2007/0192314 A1 | 8/2007 | Heggem |
| 2007/0198355 A1* | 8/2007 | Samson et al. ............ 705/14 |
| 2007/0203791 A1 | 8/2007 | Kohl et al. |
| 2007/0214057 A1 | 9/2007 | Lee et al. |
| 2007/0266130 A1 | 11/2007 | Mazur et al. |
| 2007/0276730 A1 | 11/2007 | Lee |
| 2007/0288433 A1 | 12/2007 | Gupta et al. |
| 2008/0065490 A1 | 3/2008 | Novick et al. |
| 2008/0077484 A1 | 3/2008 | Main et al. |
| 2008/0215438 A1 | 9/2008 | Muthugopalakrishnan et al. |
| 2008/0221997 A1 | 9/2008 | Wolfe |
| 2008/0262928 A1 | 10/2008 | Michaelis |
| 2008/0275864 A1 | 11/2008 | Kim et al. |
| 2008/0319846 A1 | 12/2008 | Leming et al. |
| 2009/0061884 A1 | 3/2009 | Rajan et al. |
| 2009/0119161 A1 | 5/2009 | Woda et al. |
| 2009/0144201 A1* | 6/2009 | Gierkink et al. ............ 705/64 |
| 2009/0254930 A1 | 10/2009 | Lo et al. |
| 2009/0281923 A1 | 11/2009 | Selinger et al. |
| 2009/0292599 A1 | 11/2009 | Rampell et al. |
| 2010/0153205 A1 | 6/2010 | Retter et al. |
| 2010/0262514 A1 | 10/2010 | Westphal |
| 2010/0262596 A1 | 10/2010 | Dumon et al. |
| 2010/0287129 A1 | 11/2010 | Tsioutsiouliklis et al. |
| 2010/0293494 A1 | 11/2010 | Schmidt |
| 2011/0106600 A1 | 5/2011 | Malik et al. |
| 2011/0106606 A1 | 5/2011 | Thordsen et al. |
| 2011/0128288 A1 | 6/2011 | Petrou et al. |
| 2011/0258027 A1 | 10/2011 | Lee et al. |
| 2012/0078731 A1 | 3/2012 | Linevsky et al. |
| 2013/0086103 A1 | 4/2013 | Achuthan et al. |
| 2013/0246196 A1 | 9/2013 | Lee et al. |

OTHER PUBLICATIONS

U.S. Appl. No. 11/643,577, Final Office Action mailed Mar. 3, 2010, 12 pgs.

U.S. Appl. No. 11/643,577, Non-Final Office Action mailed Jul. 9, 2009, 11 Pgs.

U.S. Appl. No. 11/643,577, Non-Final Office Action mailed Aug. 4, 2010, 15 pgs.

U.S. Appl. No. 11/643,577, Non-Final Office Action mailed Dec. 31, 2008, 16 pgs.

U.S. Appl. No. 11/643,577, Notice of Allowance mailed Jun. 10, 2011, 8 pgs.

U.S. Appl. No. 11/643,577, Response filed Apr. 7, 2011 to Final Office Action mailed Jan. 14, 2011, 15 pgs.

U.S. Appl. No. 11/643,577, Response filed Jun. 3, 2010 to Final Office Action mailed Mar. 3, 2010, 13 pgs.

U.S. Appl. No. 11/643,577, Response filed Oct. 9, 2009 to Non Final Office Action mailed Jul. 9, 2009, 13 pgs.

U.S. Appl. No. 11/643,577, Response filed Nov. 4, 2010 to Non Final Office Action mailed Aug. 4, 2010, 13 pgs.

U.S. Appl. No. 11/643,577, Response filed Mar. 31, 2009 to Non Final Office Action mailed Dec. 31, 2008, 13 pgs.

U.S. Appl. No. 12/610,069 , Response filed Nov. 19, 2012 to Non Final Office Action mailed Aug. 17, 2012, 13 pgs.

U.S. Appl. No. 12/610,069, Non Final Office Action mailed Aug. 17, 2012, 15 pgs.

U.S. Appl. No. 12/610,078 , Response filed Dec. 17, 2012 to Non Final Office Action mailed Aug. 17, 2012, 13 pgs.

U.S. Appl. No. 12/610,078, Non Final Office Action mailed Aug. 17, 2012, 14 pgs.

U.S. Appl. No. 13/171,057, Non Final Office Action mailed Mar. 7, 2012, 14 pgs.

U.S. Appl. No. 13/171,057, Notice of Allowance mailed Oct. 11, 2012, 8 pgs.

U.S. Appl. No. 13/171,057, Response filed Jun. 7, 2012 to Non Final Office Action mailed Mar. 7, 2012, 10 pgs.

* cited by examiner ant shipping information for an item. Additional examples, actions can include buying an item associated with an up-selling campaign, winning an "competitive" auction (e.g., an auction with multiple bids from the same bidder(s)), or buying an

METHODS AND SYSTEMS FOR DYNAMIC COUPON ISSUANCE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009, eBay, Inc. All Rights Reserved.

TECHNICAL FIELD

This application relates generally to transactions over a distributed network, and more specifically to methods and systems for dynamically issuing coupon within a network-based publication system.

BACKGROUND

Traditional paper coupons delivered through the mail or in the newspaper have been used by organizations for years to incent desired customer behaviors. The basic delivery mechanisms for traditional coupons have changed little over the years even as new technologies have altered the way the typical consumer receives purchase information and makes purchase decisions.

The advent of the Internet has driven the development of new methods of delivering information to consumers and provided marketers additional avenues for delivering promotional information, such as electronic mail. The ease and relatively low cost of sending out electronic promotional information has led to a dramatic increase in the amount of promotional information received by the average consumer. Interestingly, most promotional information remains completely anomoyous, untargeted, and generally ignored by the recipent. Some efforts at personalization and targeted marketing has been developed through mechanisms such as opt-in electronic mail programs.

As part of the electronic marketing revolution driven primarily by the ease of communication over the Internet, coupon delivery has also moved online. However, other than the mechanism of delivery, coupons have changed little in the transition to electronic delivery. Coupons remain anonymous promotions targeted at large groups of consumers. Even coupons delivered through some sort of opt-in electronic marketing campaign will be redeemable by anyone that receives the offer.

BRIEF DESCRIPTION OF THE DRAWINGS

Some embodiments are illustrated by way of example and not limitation in the figures of the accompanying drawings in which.

DETAILED DESCRIPTION

Figure 1:
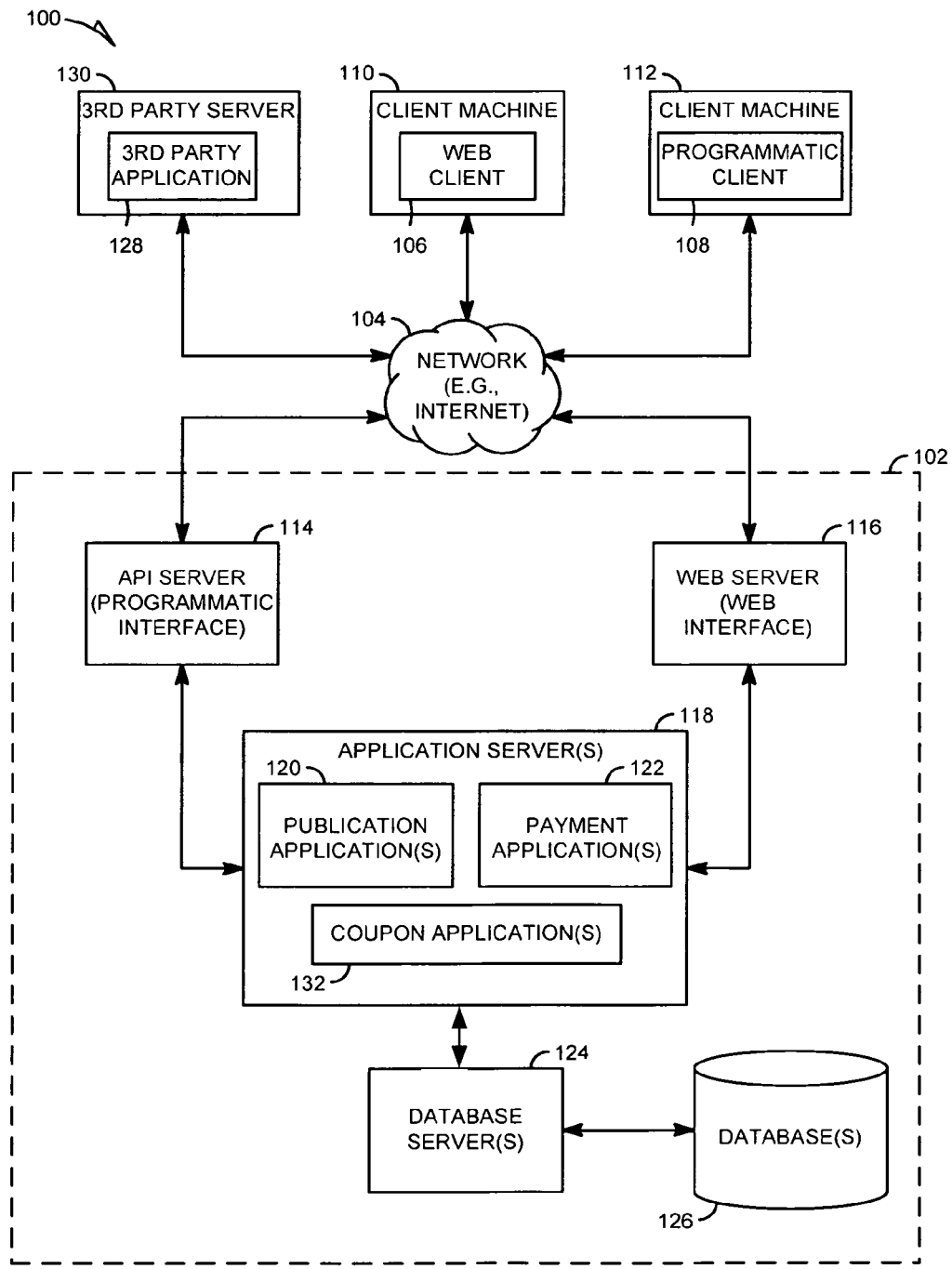
FIG. 1 is a block diagram illustrating an example architecture for a network-based publication system within which methods and systems for dynamically issuing coupons can be implemented.

Example methods and systems to dynamically issue coupons are described. The systems and methods for dynamically issuing coupons, in some example embodiments may provide a user with a coupon while browsing a network-based publication system. In the following description, for purposes of explanation, numerous specific details are set forth in order to provide a thorough understanding of example embodiments. It will be evident, however, to one skilled in the art that the present invention may be practiced without these specific details. It will also be evident, that coupon issuance is not limited to the examples provided and may include other scenarios not specifically discussed.

In accordance with an example embodiment, the system can issue a real-time coupon to a user that fits one or more specified criteria while still on the network-based publication system (also referred to as the "site"), such as for example a network-based marketplace, a network-based store, or other commerce enabling system. In this example, a real-time coupon refers to a coupon issued to a user during a session browsing a network-based publication system. In the context of coupon generation and delivery, both Real-time and instantaneous refer to the generation and/or delivery occurring immediately. However, in the context of any computerized system "immediately," "real-time," or "instantaneous" are all constrained by the time it takes for the process under computer control to occur. In an example, the criteria can include a previous purchase by the user, the user's gender, or a combination of similar parameters. In some examples, the criteria can be the performance of certain actions by the user on the site, which can be monitored in real-time. For example, on an auction-based site, losing a certain number of auctions could trigger a coupon to be issued. In additional examples, actions can include buying an item associated with an up-selling campaign, winning an "competitive" auction (e.g., an auction with multiple bids from the same bidder(s)), or buying an item associated with featured accessories. In some examples, the user's actions are monitored in real-time on the site. In certain examples, the user's actions are derived from analyzing historical transaction data. The historical transaction data can be analyzed in regular batches (e.g., daily or weekly). In an example, the user's actions can be determined from a combination of monitored activity and historical transaction data analysis. In some additional examples, criteria for issuing a coupon to the user can also include user profile data, which can include demographics tracked by the network system.

Various methods can be used to select users to be eligible to received coupons while browsing on the site. For example, coupon issuance models can be developed based on historical transaction data from a network-based publication system. These historical coupon issuance models can then be applied to users activity using the site. The coupon issuance model can include rules or conditions that the user must satisfy, such as the user purchased an item in a specified category or the purchase price for the purchased item is at least a specified dollar amount. The following is a list of example rules that can be included in a coupon issuance model:

The user purchased an item using a coupon (or not using a coupon).

The previous M item(s) that the user purchased were not paid with a coupon in the last D1 days.

The user has made less than T purchases in the last D2 days.

The user has redeemed less than K coupons within the same campaign in the last D3 days.

The user has any outstanding payments (or not). An outstanding payment is defined as:
  Any incomplete or pending payment of won items in the past 2 weeks.
  The number of successful bids is not equal to the number of completed payments in the last 2 weeks.
  The user has any live bids (or not). This is defined as:
  The user is the highest bidder on any live auction.
  The end date of this live auction is prior to the expiration date of the dynamic issuance coupon that will be issued.
  The user is a rewards or loyalty program participant (or not).

Additionally, lists of eligible users can be created based on demographics or the individual user's purchase history. User demographics can include age, gender, income level, race, education, hobbies, or any personal characteristic that may be collected or recorded about an individual user. In certain examples, an administrative interface is provided to allow creation of eligible user lists.

Once the system determines a coupon is going to be issued to a user, it can be presented within the network-based publication system through various avenues. For example, the coupon could be delivered to the user through some sort of on-site messaging system, such as while the user is viewing an item relevant to the coupon. A coupon can also be surfaced within the user's account page. The network-based publication system's web interfaces is configurable to provide visual indications of a coupon, such as through a page header common across multiple pages of the site. In certain examples, the coupon may be issued and surfaced during the check out process.

In one example embodiment, the user is issued a coupon targeted specifically at the user. Targeted variable value coupons can be used for user-specific, targeted incentives related to rewards programs and courtesy coupon programs. The system can create coupons with different discount amounts, percentage discounts, and expiration dates for individual users. In this embodiment, the targeted coupon can only be redeemed by the user to whom it was issued. In certain examples each individual user can be assigned a unique coupon redemption code. In some examples, the targeted coupons are redeemed based on the user's login credentials with the network-based publication system. In other examples, the targeted coupons are redeemed based on the user's email address. In yet other examples, the targeted coupons are redeemed through the user's method of payment, such as via Paypal™ online payment services (from eBay Inc. of San Jose, Calif.) or a credit card.

In another example embodiment, a user who is eligible to receive a dynamically generated coupon while browsing the network-based publication system can be placed into a control group. A control group is intended to provide a baseline comparison group with similar characteristics to those that received coupons. The baseline comparison group can be used to analyze the effectiveness of issuing a coupon campaign. The control group can be thought as similar to medical study participants who receive the placebo instead of the drug under study. Once placed into a control group, this otherwise eligible user will not receive a coupon. The control groups can be maintained for each coupon campaign, allowing a user to be in a control group with regard to one type of coupon, but receive other coupons. Control group membership can be controlled by setting a percentage of eligible users, for example ten percent of all eligible users will be selected for the control group. In this example, every tenth user that would have been selected to receive a coupon can be placed in the control group. Typical values for the control group percentages are 10%, 20%, 25%, 33%, or 50%, but any desired percent can be supported. The system is configurable to monitor subsequent user activity of users placed in a control group in order to provide for evaluation of coupon campaign effectiveness.

In some examples, the coupon campaigns are controlled through a coupon budgeting engine. The coupon budgeting engine allows a merchandiser, marketing person, or individual merchant to control the approximate dollar amount of coupons issued through the system. The coupon budgeting engine also allows for control over the coupon campaign's start and end dates, as well as coupon expiration dates. The coupon budgeting engine can be implemented as a stand-alone web application used to submit coupon metadata to a coupon infrastructure hosted by the network-based publication system. As individual unique coupons are issued to each eligible user, the coupon budgeting engine can provide the capability to suspend or cancel individual coupons or an entire campaign.

Further details regarding the various example embodiments described above will now be discussed with reference to the figures accompanying the present specification.

Platform Architecture

FIG. 1 is a block diagram illustrating an example architecture for a network-based publication system within which methods and systems for dynamically issuing coupons can be implemented. The block diagram depicting a client-server system 100, within which an example embodiment can be deployed. A networked system 102, in the example forms of a network-based marketplace, on-line retail site, or publication system, provides server-side functionality, via a network 104 (e.g., the Internet or Wide Area Network (WAN)) to one or more clients 110, 112. FIG. 1 illustrates, for example, a web client 106 (e.g., a browser, such as the INTERNET EXPLORER browser developed by Microsoft Corporation of Redmond, Washington State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more publication applications 120, payment applications 122, and coupon applications 132. The application servers 118 are, in turn, shown to be coupled to one or more databases servers 124 that facilitate access to one or more databases 126. In some examples, the application server 118 can access the databases 126 directly without the need for a database server 124.

The publication applications 120 may provide a number of publication functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the publication system applications 120. The payment application 122 may also be configured to allow for the redemption of coupons issued by the coupon applications 132. The coupon applications 132 may provide a number of coupon related services and functions to users. The coupon applications 132 may be configured to issue coupons directly to users of the networked system 102. Additionally, the coupon applications is configurable to send coupons to users via communication channels external to the networked system 102, such as electronic mail or even standard postal mail. The coupon applications 132 may also be response for surfacing coupons within the networked system 102 during a user session. Surfacing (or presenting) coupons to a user can be done in a manner that is contextually relevant to the portion of the networked system 102 currently being interacted with by the user. While the publication, payment, and coupon applications 120, 122 and 132 are shown in FIG. 1 to all form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various publication, payment, and coupon applications 120, 122 and 132 could also be implemented as standalone software programs, which do not necessarily have networking capabilities.

The web client 106 accesses the various publication, payment, and coupon applications 120, 122 and 132 via the web interface supported by the web server 116. Similarly, the programmatic client 108 accesses the various services and functions provided by the publication, payment, and coupon applications 120, 122 and 132 via the programmatic interface provided by the API server 114. The programmatic client 108 may, for example, be a seller application (e.g., the TURBOLISTER application developed by eBay Inc., of San Jose, Calif.) to enable sellers to author and manage listings on the networked system 102 in an off-line manner, and to perform batch-mode communications between the programmatic client 108 and the networked system 102. Programmatic clients 108 can also be provided that enable sellers to author and manage coupons and coupon campaigns on the networked system 102 in either an on-line or off-line mode.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, publication or payment functions that are supported by the relevant applications of the networked system 102. Additionally, the third party website may provide a user access to view coupons issued by the networked system 102 through the coupon applications 132.

Publication Applications

Figure 2:
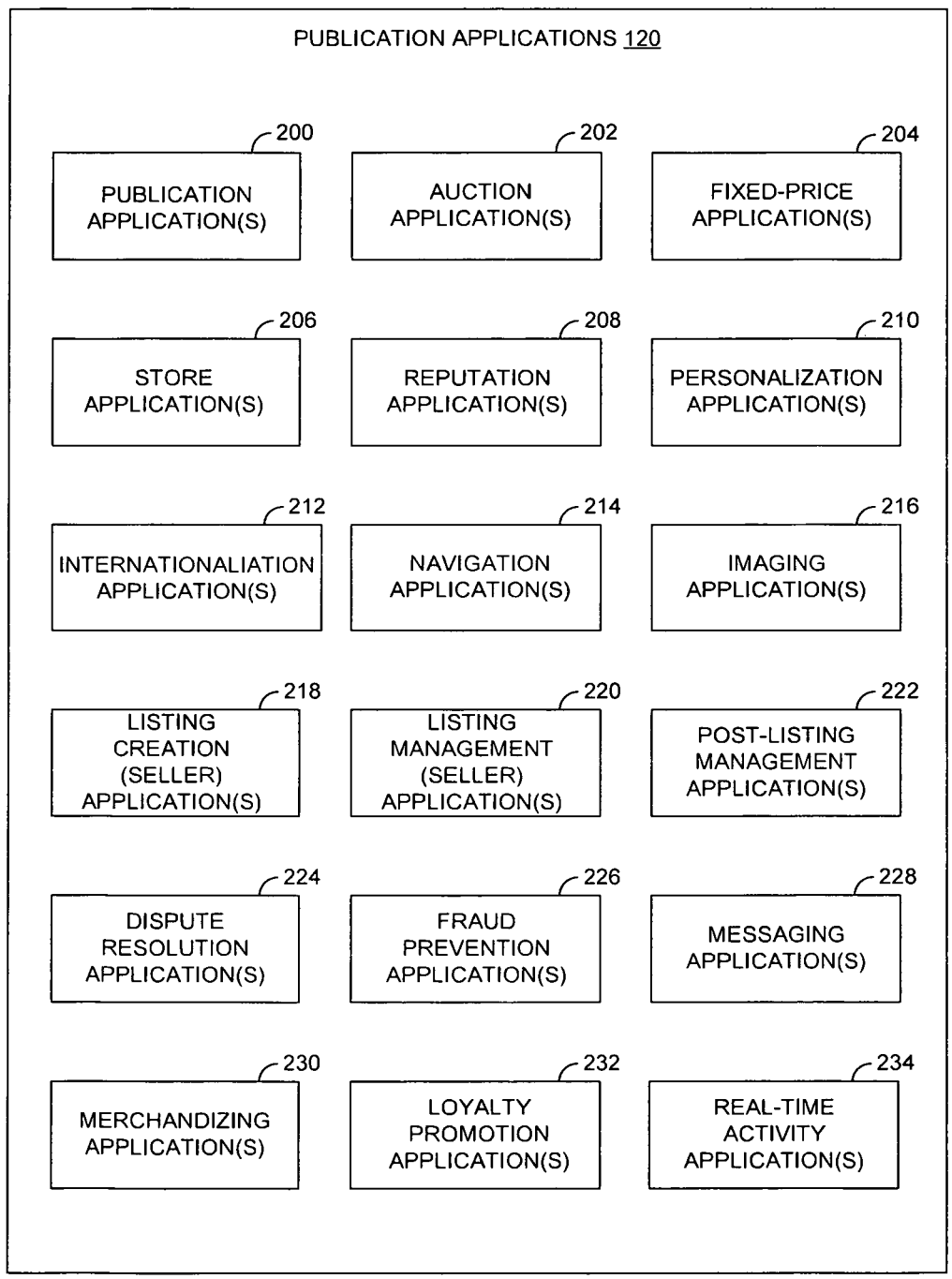
FIG. 2 is a block diagram illustrating multiple applications that, in one example embodiment, provided as part of the network-based publication system some of which can be used for dynamically issuing coupons, among other things.

FIG. 2 is a block diagram illustrating multiple applications 120 that, in an example embodiment, are provided as part of the networked system 102. The applications 120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 126 via the database servers 128.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication applications 120 may include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller or merchant. Such a virtual store may also offer promotions, incentives and features that are specific and personalized to a relevant seller. The coupon applications 132 or coupon modules 314 is configurable to provide coupon related services through the store applications 206 to individual sellers. In this example, individual sellers can access many of the coupon related functions described herein. For instance, through the coupon applications 132 a seller can create a coupon campaign specific to the seller's personalized "virtual" store.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. A personalized reference page is configurable to display all coupons issued to the user by one of the coupon applications 132 or stored within the coupon infrastructure 304. Further, a personalization application 210 may enable a user to personalize listings and other aspects of their interactions with the networked system 102 and other parties. Additionally, a personalization application can enable a user to view and organize coupons issued by the publication system or individual merchants within the publication system.

The networked system 102 may support a number of publication systems that are customized, for example, for specific geographic regions. A version of the networked system 102 may be customized for the United Kingdom, whereas another version of the networked system 102 may be customized for the United States. Each of these versions may operate as an independent publication system, or may be customized (or internationalized) presentations of a common underlying publication system. The networked system 102 may accordingly include a number of internationalization applications 212 that customize information (and/or the presentation of information) by the networked system 102 according to predetermined criteria (e.g., geographic, demographic or publication system criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or inventory data structures according to which listings may be classified within the networked system 102. Various other navigation applications may be provided to supplement the search and browsing applications. Certain navigation applications may be configured to surface coupons relevant to the search or browsing pages delivered in response to a user's query.

In order to make listings, available via the networked system 102, as visually informing and attractive as possible, the publication system applications 120 may include one or more imaging applications 216 utilizing which users may upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers conveniently to author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such messages for example advising users regarding the status of listings at the networked system 102 (e.g., providing "outbid" notices to bidders during an auction process or to provide promotional and merchandising information to users). The messaging applications 228 can also be used to deliver coupons generated by the coupon applications 132 to users on the networked system 102. Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks. The messaging applications 228 may also be configured to communicate over certain social networking platforms, such as Twitter or Facebook. Communication with a social networking platform may require installation of a application or plug-in within a user's social network account.

Merchandising applications 230 support various merchandising functions that are made available to sellers to enable sellers to increase sales via the networked system 102. The merchandising applications 80 also operate the various merchandising features that may be invoked by sellers, and may monitor and track the success of merchandising strategies employed by sellers. The merchandising applications 230 may also provide an additional mechanism for sellers to create and manage coupon campaigns within the networked system 102.

The networked system 102 itself, or one or more parties that transact via the networked system 102, may operate loyalty programs that are supported by one or more loyalty/promotions applications 232. For example, a buyer may earn loyalty or promotions points for each transaction established and/or concluded with a particular seller, and be offered a reward for which accumulated loyalty points can be redeemed. The loyalty promotion applications 232 may work in conjunction with the coupon applications 132 to reward loyal users with valuable coupons for use within the networked system 102.

Real-time activity applications 234 support various functions within the networked system 102 by providing real-time information about user activities within the networked system 102. For example, the real-time activity applications 234 can provide information to the messaging applications 228 or personalization applications 210 to enhance a user's experience or improve a seller's ability to move merchandise. In certain examples, the real-time activity applications 234 provide real-time activity data to the coupon applications 132 enabling real-time, instantaneous delivery of user targeted coupons. Real-time activity data, delivered by the real-time activity applications 234, may also be used to coordinate delivery of coupons within the networked system 102 and through external communications channels supported by the messaging applications 228. The real-time activity data can also be used to trigger contextual display of coupons already issued to the user. For example, if the user is viewing an item listing for a digital camera, this information can be provided to the coupon applications 132, which can then trigger the display of a coupon from a seller specializing in digital cameras.

Coupon Modules

Figure 3:
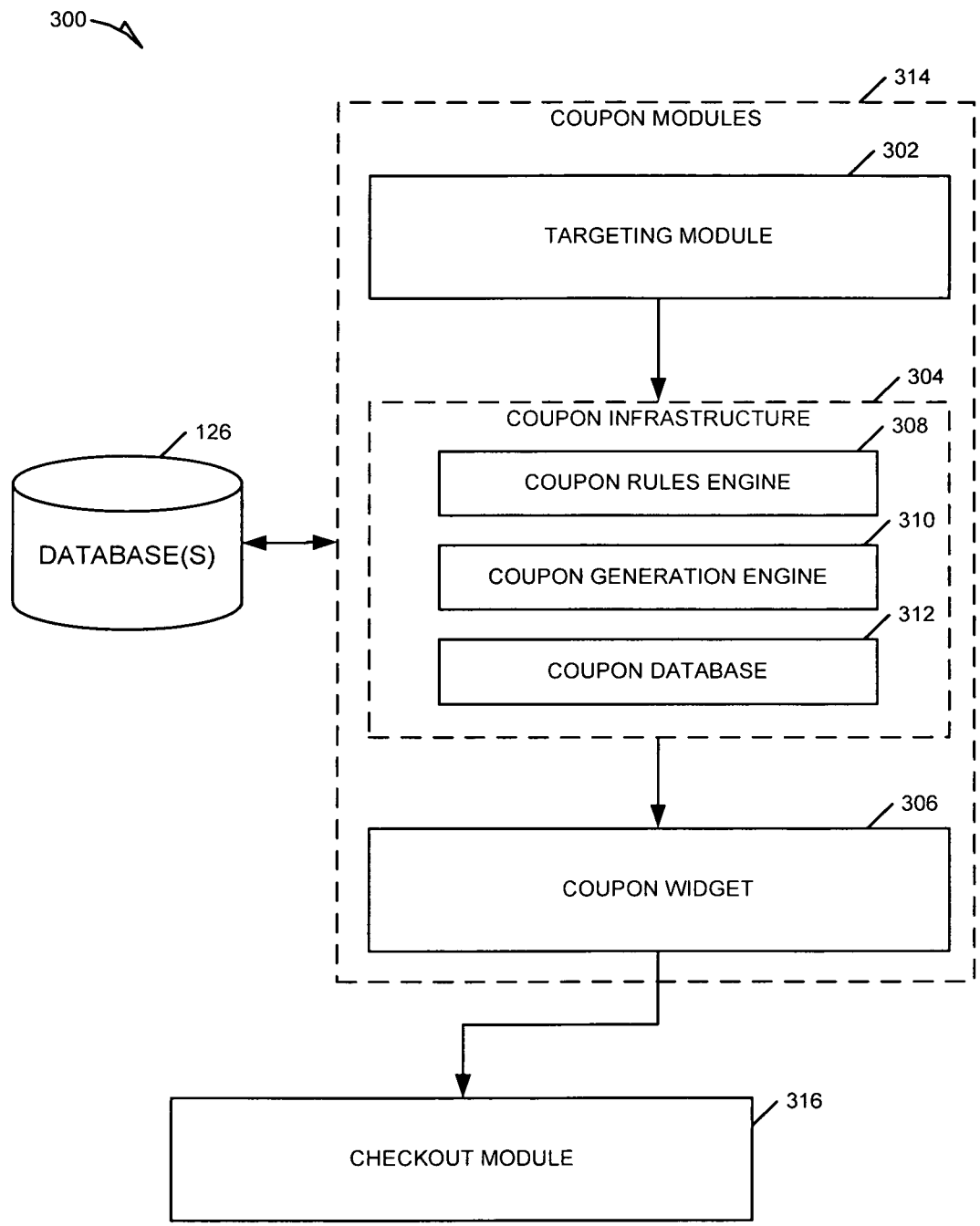
FIG. 3 is a block diagram illustrating an example system for dynamically issuing coupons.

FIG. 3 is a block diagram illustrating an example couponing system 300 for dynamically issuing coupons. As shown in the example illustrated by FIG. 3, the system 300 includes coupon modules 314, a checkout module 316 and the databases 126. The coupon modules 314 include a targeting module 302, a coupon infrastructure 304, and a coupon widget 306. In certain examples, the coupon infrastructure 304 includes a coupon rules engine 308, a coupon generation engine 310, and a coupon database 312. The coupon database 312 can be a separate stand-alone database within the coupon infrastructure 304 or it can be one or more interconnected tables within the databases 126, such as the coupon table 518 illustrated in FIG. 5.

The targeting module 302 is configurable to create coupon issuance models used by the coupon infrastructure 304 to generate coupons for users of the networked system 102. The targeting module 302 is configurable to create lists of users that are eligible to be issued coupons. In an example, the targeting module 302 receives instructions from one or more of the publication system applications 120 to pull data from the databases 126 to create lists of coupon eligible users. In certain examples, the targeting module 302 stores various coupon issuance models within the databases 126 for use in future couponing campaigns. The coupon issuance models can include various conditions that are evaluated by the coupon infrastructure 304 in determining whether to issue a coupon. In certain examples, the targeting module can deliver coupons through the messaging applications 228, based on a list of eligible users.

The coupon infrastructure 304, in some example embodiments, is responsible for evaluating coupon issuance models, generating and storing coupons for use by users within the networked system 102. In an example, the coupon infrastructure 304 includes a coupon rules engine 308 that can be used to evaluate one or more coupon issuance models. In certain examples, the coupon rules engine 308 also determines whether a targeted user is on a list of users eligible to receive a coupon, before signaling the coupon generation engine 310 to create a coupon. In another example, the coupon rules engine 308 can select contextually relevant coupons for presentation to the user. In this example, the coupon rules engine 308 receiving information regarding a user's current location, environment and/or context within the networked system 102 to determine which coupons may be relevant for display. In certain examples, the coupon generation engine 310 can generate a coupon represented by coupon metadata, shown below in Table 1 as example XML tags. In other examples, the coupon generation engine 310 generates coupons through interaction with the coupon database 312. The coupon database 312, in some example embodiments, stores all generated coupons for use within the networked system 102. The coupon infrastructure, in certain example embodiments, is configured to transmit coupons through communication channels external to the networked system 102. In some examples, the coupon infrastructure uses the messaging applications 228 to handle communication of coupons.

TABLE 1

Example Coupon Metadata

```
<CouponMetadata>
    <summary_action>insert</summary_action>
    <external_id>123456</external_id>
    <program_code>CRTYS200</program_code>
    <adjacency_id>0</adjacency_id>
    <incentive_type>3</incentive_type>
    <coupon_value_type>1</coupon_value_type>
    <coupon_application_type>1</coupon_application_type>
    <coupon_type>1</coupon_type>
    <iso_country_code>US</iso_country_code>
    <language>EN</language>
    <iso_currency_code>USD</iso_currency_code>
    <budget_amount>300000</budget_amount>
    <start_date>02/01/2008 14:59:59</start_date>
    <expiration_date>05/23/2008 00:59:59</expiration_date>
    <category_id>14339, 12314, 92382</category_id>
        <status>1</status>
    <display_message> <![CDATA[This a custom description. The offer
    is {offer}%, up to ${max}. Min purchase is ${min}.]]>
    </display_message >
    <min_purchase_amount>200</min_purchase_amount>
    <coupon_max_discount_amount>500</coupon_max_discount_amount>
    <faq_url>http://www.mpname.com/us_termsfaq.html</faq_url>
    <coupon_discount_percent>14.5</coupon_discount_percent>
    <incntv_max_usage_count>5</incntv_max_usage_count>
</CouponMetadata>
```

The coupon widget 306 is configurable to present coupons generated by the coupon infrastructure 304 to a user accessing the networked system 102. In certain examples, the coupon widget can also be configured to communicate coupons over various communication channels, both internal and external to the networked system 102, such by leveraging the messaging applications 228. In some examples, the coupon widget 306 may be a small applet that runs within a third party application 128 to display coupons to registered users of the network system 102. For example, a Facebook application can incorporate the coupon widge 306 and be configured to display coupons to a user within the user's Facebook account. In these examples, the coupon widget 306 is configurable to communication through the API server 114 in order to access the coupon infrastructure 304. In these various examples, the coupon infrastructure can coordinate delivery of a targeted coupon to a user through both the coupon widget 306 and the messaging applications 228. The coupon widget can also present contextually relevant coupons selected by the coupon rules engine 308 based on current user interactions with the networked system 102.

The checkout module 316 is configurable to allow a user of the networked system 102 to complete the purchase process. The coupon widget 306 is configurable to work in conjunction with the checkout module 316 to present contextually relevant coupons to the user during the checkout process. In some examples, the coupon widget 306 can display only those coupons that can be applied to the items the user is attempting to checkout using the checkout module 316. In certain examples, the checkout module 316 can support selection of coupons stored in the coupon infrastructure 304 as well as entry of legacy coupon codes.

Coupon System

Figure 4:
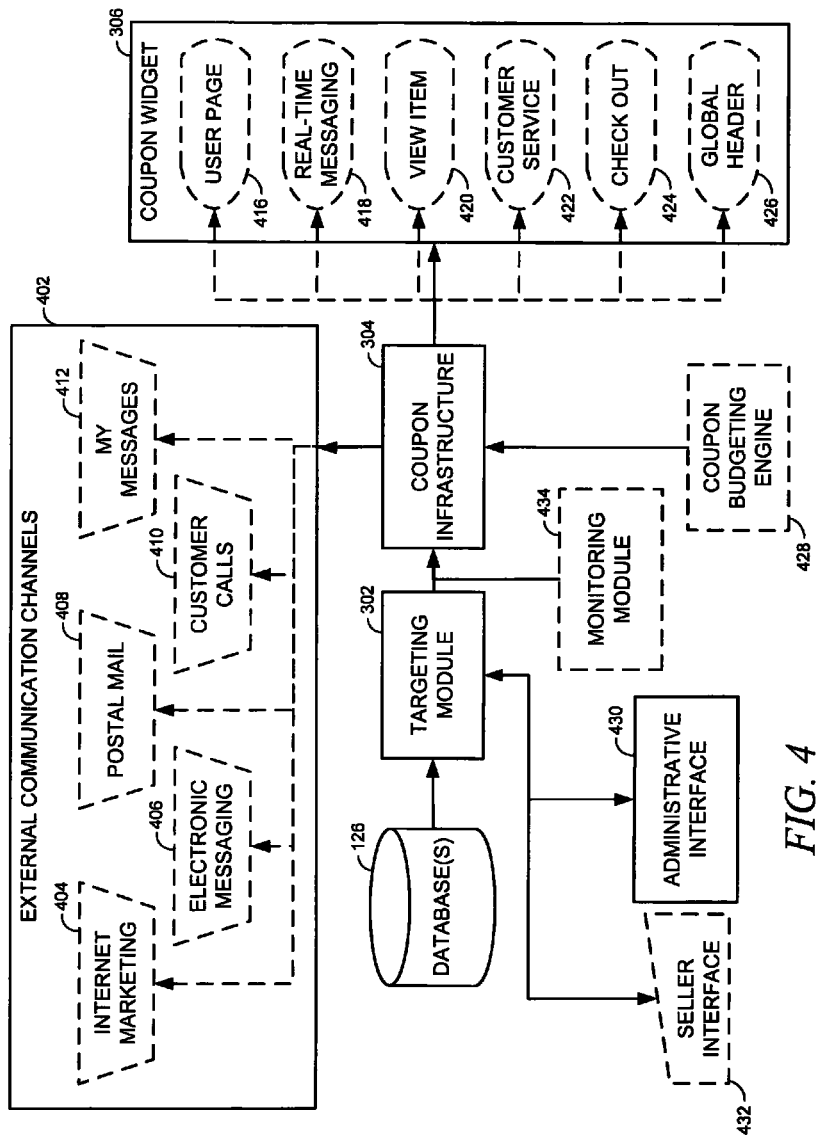
FIG. 4 is a block diagram illustrating an example coupon system, which can be implemented as part of a network-based publication system.

FIG. 4 is a block diagram illustrating an example coupon system 400, which can be implemented as part of a networked system 102. In an example embodiment, the coupon system 400 includes the targeting module 302, the coupon infrastructure 304, the coupon widget 306, external communication channels 402, an administrative interface 430, and the databases 126. In some examples, the coupon system 400 also includes a seller interface 432, a monitoring module 434, and a coupon budgeting engine 428.

The coupon system 400, in an example embodiment, includes various external communication channels, such as internet marketing 404, electronic messaging 406, postal mail 408, customer calls 410 and my messages 412. In an example, the internet marketing channel 404 can be used to present targeted user coupons to registered users of the network system 102 while the user is accessing a third party's web site or application. For example, the internet marketing channel 404 is configurable to deliver targeted coupons through Internet search engines, such as www.yahoo.com (provided by Yahoo!, Inc. of Sunnyvale, Calif.). In some examples, the external communication channels 402 can also be supported through the messaging applications 228. For example, the "my messages" channel 412 can be an external messaging system operating on the networked system 102 and supported by the messaging applications 228.

In various example embodiments, the coupon widget 306 is configurable to surface coupons within the network system 102 through a user page 416, real-time messaging 418, a view item listing page 420, a customer service interface 422, a checkout mechanism 424, and a global web page header 426. The user page 416 can be provided through the personalization applications 210 and is configurable to display information associated with a registered user's interactions with the network system 102. In an example, real-time messaging 418 is configurable to display messages, such as coupons, to a user browsing on the network system 102. For example, a user may enter a search request on the network system 102, the search request can return a list of results and a portion of the web page may include a message delivered through real-time messaging 418. The message delivered through real-time messaging can include one or more coupons issued to the user relevant to the search results. In certain examples, each web page generated by the network system 102 can include a common global header 426 with a section dedicated to displaying information associated with a registered user. In an example embodiment, the coupon infrastructure 304 coordinates coupon delivery between the external communication channels 402 and the coupon widget 306. For example, a coupon generated for a specific user can be delivered to the networked system 102 via the coupon widget, while the same coupon is sent via electronic messaging 406 to the users cellular phone. In this example, within the networked system 102, the coupon widget 306 may surface the coupon within the user's user page 416 or through the global header 426.

In an example, the administrative interface 430 can be used to setup coupon campaigns within the targeting module 302. Coupon campaigns can include the creation of a list of users eligible to receive a coupon as well as one or more rules or conditions, which may be stored in a coupon issuance model. In certain examples, the administrative interface 430 can be used to create and store, within the database 126, coupon issuance models for future coupon campaigns. In these examples, a coupon campaign refers to the creation of a promotion within the networked system 102 to encourage users to make purchases through issuing coupons, such as five (5) dollars off your next purchase or ten percent (10%) off an iPod brand music player (from Apple, Inc. of Cupertino, Calif.). In some examples, the coupon budgeting engine 428 can be used to configure the financial aspects of a coupon campaign, as well as the start and end dates of the campaign. For example, through the coupon budgeting engine 428, a seller or merchandiser can configure a coupon campaign to issue up to five thousand dollars in a certain type of coupon and have the campaign run from May $1^{st}$ through September $1^{st}$. In another example, the coupon budgeting engine 428 can monitor the coupon infrastructure 304 to determine when a pre-selected dollar amount of issued coupons have been redeemed, as a measure of when to end a coupon campaign.

In some example embodiments, the monitoring module 434 is configurable to track the activity of a user interacting with the networked system 102. The monitoring module 434 can provide this real-time activity information to the coupon infrastructure 304 for use in evaluating whether a user has met the necessary conditions to issue a coupon. For example, a certain coupon campaign may require that a user view three listings within a certain category during a single user session prior to issuing a coupon. In this example, the monitoring module 434 can track the user's interactions and provide real-time information to the coupon rules engine 308 where the condition can be evaluated. As soon as the user visits the third listing within a specified category, the coupon rules engine 308 can trigger the coupon generation engine 310 issue a coupon to the user, which can then be presented through the coupon widget 306. In this example, the coupon widget 306 can present the coupon during the current user session, while the user may still be considering a purchase. The monitoring module 434 can also provide information to the coupon infrastructure to enable contextual display of coupons based on a user's current location within the networked system 102.

Data Structures

Figures 5A, 5B:
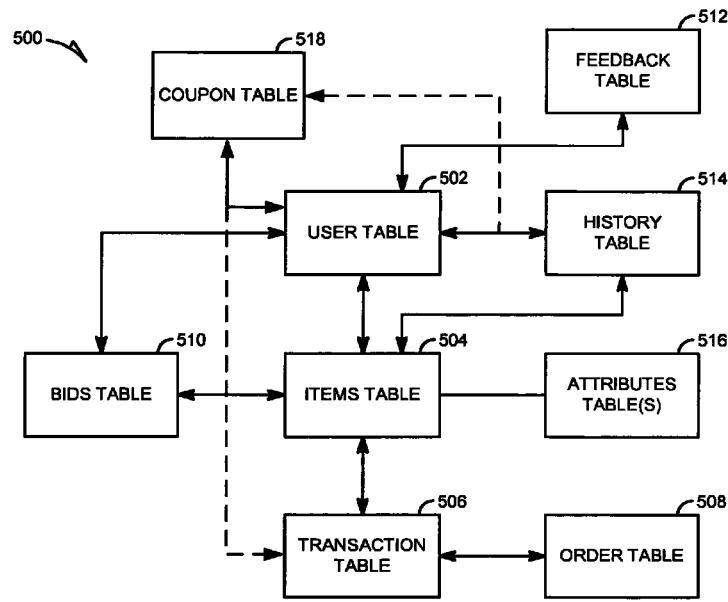
FIG. 5A is a high-level entity-relationship diagram, illustrating various tables that may be maintained within databases supporting the network-based publication system, and that are utilized by and support the network-based publication system applications.
FIG. 5B is a block diagram illustrating example fields in an example coupon table.

FIG. 5A is a high-level entity-relationship diagram, illustrating various tables 500 that may be maintained within the databases 126, and that are utilized by and support the applications 120, 122, and 132. A user table 502 contains a record for each registered user of the networked system 102, and may include identifier, address and financial instrument information pertaining to each such registered user. A user may operate as a seller, a buyer, or both, within the networked system 102. In one example embodiment, a buyer may be a user that has accumulated value (e.g., commercial or proprietary currency), and is accordingly able to exchange the accumulated value for items that are offered for sale by the networked system 102.

The tables 500 can also include an items table 504 in which are maintained item records for goods and services that are available to be, or have been, transacted via the networked system 102. Each item record within the items table 504 may furthermore be linked to one or more user records within the user table 502, so as to associate a seller and one or more actual or potential buyers with each item record.

A transaction table 506 contains a record for each transaction (e.g., a purchase or sale transaction) pertaining to items for which records exist within the items table 504.

An order table 508 is populated with order records, each order record being associated with an order. Each order, in turn, may be with respect to one or more transactions for which records exist within the transaction table 506.

Bid records within a bids table 510 each relate to a bid received at the networked system 102 in connection with an auction-format listing supported by an auction application 202. A feedback table 512 is utilized by one or more reputation applications 208, in one example embodiment, to construct and maintain reputation information concerning users. A history table 514 maintains a history of transactions to which a user has been a party. One or more attributes tables 516 record attribute information pertaining to items for which records exist within the items table 504. Considering only a single example of such an attribute, the attributes tables 516 may indicate a currency attribute associated with a particular item, the currency attribute identifying the currency of a price for the relevant item as specified in by a seller.

A coupon table 518 can be populated with coupon records, each coupon record being associated with a user. In this example, coupons are issued to an individual user. Each coupon may also be associated with a transaction in the transaction table 506, provided the coupon has been redeemed by the user. A redeemed coupon may also has an associated record in the history table 514.

FIG. 5B is a block diagram illustrating example fields in an example coupon table 518. In an example, the coupon table 518 can include fields including User ID 520, External ID 522, Program Code 524, Incentive Type 526, Value Type 528, Application Type 530, Coupon Type 532, ISO Country Code 534, Budget Amount 536, Start Date 538, Expiration Date 540, Category ID 542, Status 544, Display Message 546, Minimum Purchase Amount 548, Maximum Discount Amount 550, Discount Percentage 552, and Maximum Usage Count 554. In other examples, the coupon table 518 could include additional fields, such as Transaction ID, linking the coupon to a completed transaction. The User ID 520 can be a link into the User Table 502. The External ID 522 can used to identify the coupon in third party systems, for example. The Program Code 524 can be used to identify the coupon campaign responsible for issuing the coupon. The Incentive Type 526 can be used in an example to indicate who issued the coupon. In some examples, coupons can be issued by the networked system 102, by individual seller's providing merchandise or services through the networked system 102, or by product manufacturers. The coupon Type 532 can be used to indicate whether the coupon is a fixed value coupon or a percent off coupon. The ISO Country Code 534 can be used to indicate what countries the coupon is valid within. The Budget Amount 536 can be used to indicate the total budget for the coupon campaign. In certain examples, a coupon is configurable to automatically expire once the budget amount assigned to the coupon campaign is reached. The Start Date 538 can be used to indicate the earliest date on which the coupon can be redeemed. The Expiration Date 540 can be used to indicate the last date on which the coupon can be redeemed. In certain example, a coupon can be associated with a particular product or service category within the networked system 102. In these examples, the Category ID 542 can be used to link the coupon to the valid category. The Status 544 can be used to indicate whether the coupon is active, redeemed, or expired, for example. The Display Message 546 can be used to provide a message to the user upon receiving or redeeming the coupon. The Minimum Purchase Amount 548 can be used to indicate a minimum purchase necessary to redeem the coupon. The Maximum Discount Amount 550 can be used to indicate the maximum dollar value (monetary value) of the coupon. For example, the coupon could be a 10% off coupon with a maximum discount amount of $50, which means that anything purchased over $500 would still only receive $50 off the purchase price. The Discount Percentage 552 can be used to indicate the percent value of a percentage off type coupon. The Maximum Usage Count 554 can be used to indicate how many times a coupon can be redeemed. For example, a single use coupon can have a maximum usage count 554 of one.

The previous paragraph provides a description of an example embodiment of the coupon table 518. The described embodiment can include additional or fewer fields depending upon the capabilities provided within a particular networked system 102.

Coupon Issuance Methods

Figure 6:
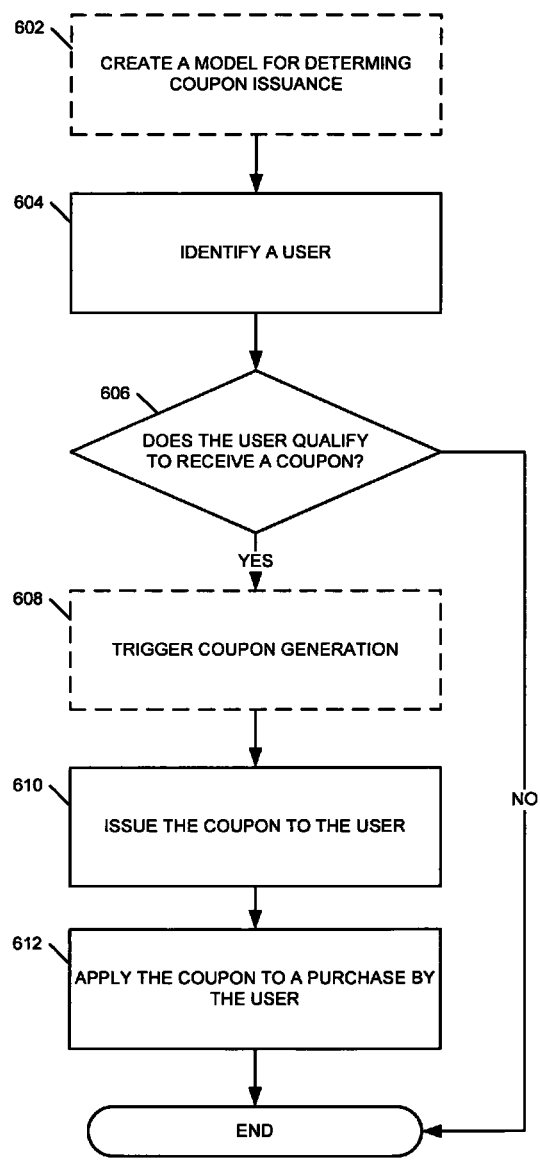
FIG. 6 is a flow chart illustrating an example method for dynamic coupon issuance.

FIG. 6 is a flow chart illustrating an example method 600 for dynamic coupon issuance. The method 600 may be performed by processing logic that may comprise hardware (e.g., dedicated logic, programmable logic, microcode, etc.), software (such as executes on a general purpose computer system or a dedicated machine), or a combination of both. In an example embodiment, the processing logic resides within the coupon applications 132 illustrated in FIGS. 1 and 3. The processing logic may also partially or completely reside within the coupon system 400 illustrated in FIG. 4. The method 600 may be performed by the various modules discussed above with reference to FIGS. 1 through 4, notwithstanding that certain modules are discussed as performing certain functions in the immediately following description. Each of these modules may comprise processing logic.

As shown in FIG. 6, the method 600 includes operations for identifying a user 604, deciding whether the user qualifies to receive a coupon 606, presenting the coupon to the user 610, and applying the coupon to a purchase by the user 612.

In an example, the method 600 can commence at operation 604 with the web server 116 identifying a user accessing the networked system 102. In an example, the user identified at 604 is a registered user within the networked system 102. In this example, the coupon infrastructure 304 can access profile data stored in the databases 126 on this user. In certain examples, the coupon infrastructure 304 can also access activity data associated with the user. The activity data can be historical activity data stored in the databases 126, which can include purchase history, browsing (interaction) activity history and frequency of visits to the networked system 102. Additionally, the activity data can be real-time activity provided by the real-time applications 234, which can include information about the user's current session as well as any recent sessions not yet stored in the databases 126.

At operation 606, in an example embodiment, method 600 continues with the coupon infrastructure 304 determining whether the user identified at operation 604 is qualified to receive a coupon. If the identified user is not eligible to receive a coupon, for example the user may not be on an eligible user list controlling the coupon campaign, then method 600 ends without issuing a coupon. However, if the identified user is eligible to receive a coupon and meets any conditions that may be associated with the coupon campaign, then method 600 continues at operation 608. In certain examples, the rules engine 308 can evaluate the criteria developed for a particular coupon campaign in determining whether the user is eligible to receive a coupon.

In certain examples, determining whether to issue a coupon to an identified user can include the rules engine 308 accessing the user's profile data from the databases 126 and applying the profile data against one or more rules or conditions. In some examples, activity data associated with the user can also be accessed by the rules engine 308, from either the databases 126 or the real-time activity applications 234. The coupon infrastructure 304 can then determine if any of the user's activity data satisfies the conditions defined by the coupon issuer. In some examples, the coupon infrastructure 304 works with eligible user lists and issuance criteria developed by the targeting module 302. If the conditions laid out for coupon issuance are satisfied, then the method 600 can continue to generate a coupon for the user at operation 608.

In certain example embodiments, the rules or conditions for coupon issuance are developed into a coupon issuance model. The coupon issuance model is described further below in relationship to optional operations 602. If a coupon issuance model is created, at operation 606 the coupon infrastructure 304 can utilize the coupon issuance model in determining whether the user is qualified to receive a coupon. In certain examples, the rules engine 308 evaluates the coupon issuance model to determine whether the user is qualified to receive a coupon.

In an example, once it is determined that the user is qualified to receive a coupon, at operation 606, the method 600 continues with the coupon infrastructure 304 issuing the coupon to the user. The coupon can be issued by the coupon generation engine 310 and stored in the coupon database 312. In certain examples, the coupon issued by the coupon infrastructure 304 can be unique to the identified user. The unique coupon may also be referred to as a targeted coupon. Targeted coupons can only be redeemed by the user to whom the coupon was issued. In some examples, the user is identified at the time of redemption by the user's registration with the networked system 102 (e.g. by the user's login credentials or authentication). In another example, the user is identified at the time of coupon redemption by information unique to the user, such as an electronic mail address, postal mailing address, or identification associated with a method of payment. Targeting coupons to individual users allows for closer monitoring of user behavior and further enhances the ability to target specific users or user groups.

In some examples, the coupon infrastructure 304 passes the issued coupon information to the coupon widget 306 for instantaneous presentation to the user through communication mechanisms internal to the networked system 102, such as a view item page 420, real-time messaging 418, or the global page header 426. As noted above, instantaneous simply means the the coupon will be displayed to the user as quickly as the networked system 102 can process the operations and may also be dependent upon the speed of the user's access to the networked system 102. In an example, the coupon widget 306 can make the issued coupon available to the user through multiple user interface screens hosted by the networked system 102. The coupon system 400 can enable dynamic instantaneous issuance and delivery of user targeted coupons through a combination of user tracking and real-time display capabilities.

In an example embodiment, the method 600 finishes at operation 612 with the checkout module 316 applying the coupon to a purchase by the user. In certain examples, the payment system selected by the user within the checkout module 316 will redeem the coupon against the purchase. In an example, the user can redeem the coupon during the checkout process by selecting the coupon from a list of available coupons. In another example, the user can select the coupon for application to the purchase of a certain item while viewing that item's listing within the networked system 102. In certain examples, the user can redeem the coupon during the same user session in which the coupon was issued. The capability to issue a dynamic coupon that is readily usable within the current user session provides a powerful mechanism to influence a user's online purchase decisions.

In certain example embodiments, the method 600 can begin at operation 602 by creating a coupon issuance model. The coupon issuance model can be created by the targeting module 302 and stored in the database 126. The coupon issuance model is used by the coupon infrastructure 304 to determine which users should receive coupons and under what conditions. In some examples, the coupon issuance module includes a series of rules or conditions for coupon issuance. Table 1 includes some example rules that can be used within a coupon issuance model.

TABLE 1

Example Coupon Issuance Conditions

Purchasing an item from a specified category
Purchasing an item over a specified price
Using a coupon to purchase an item
A specified number of previous purchases made without using a coupon
More or less than a specified number of purchases within a specified number of days
Outstanding payments to merchants selling items within the network-based publication system
Winning a competitive auction
Having live bids on auction listings
Losing an auction
Member of a rewards program These example conditions can be combined to generate more complex rules, such as losing an auction for an item within a specified category. Coupon issuance conditions can include any user activity that is logged by the networked system 102. Additionally, conditions can include user profile data (e.g., demographic information), such as gender or income level, provided this information is available within user profile data stored by the networked system 102. In some examples, user profile data is entered by the user upon registration for an account on the networked system 102. In other examples, the user profile data can be harvested from observing user activities on the networked system.

In an example, the method 600 can also include a coupon generation operation at operation 608. Operation 608 can generate a unique coupon for the identified user. In an example embodiment, the coupon can be generated by the coupon infrastructure 304 and stored in the coupon database 312. In another embodiment, the coupon can be generated by a third party and transmitted over network 104 to the networked system 102 for presentation to the user. Presentation can still be accomplished through the coupon widget 306 and/or via an external communication channel 402. Allowing either the targeting module 302 or the coupon infrastructure 304 to trigger external coupon generation provides additional flexibility in supporting third party coupons from product manufacturers or individual sellers within the networked system 102.

In addition to user targeted coupons, the networked system 102 supports coupons funded by the organization providing the networked system 102 (e.g., publication system host) as well as individual merchants (sellers) offering items for sale within the networked system. In an example, the publication system host will fund coupons that can be redeemed against purchases from any merchant selling items within the networked system 102. In some examples, when the publication system host is funding the coupon, when a user redeems the coupon during a purchase from merchant X, the user (e.g., the purchaser) will pay the coupon discounted price, but merchant X will receive the full undiscounted purchase price (minus any commissions or seller's fees) from the publication system host. The networked system 102 can also provide individual merchants with the ability to fund coupon campaigns. In these examples, the merchant can develop their own list of eligible users and coupon issuance models through a seller interface 432.

Figure 7:
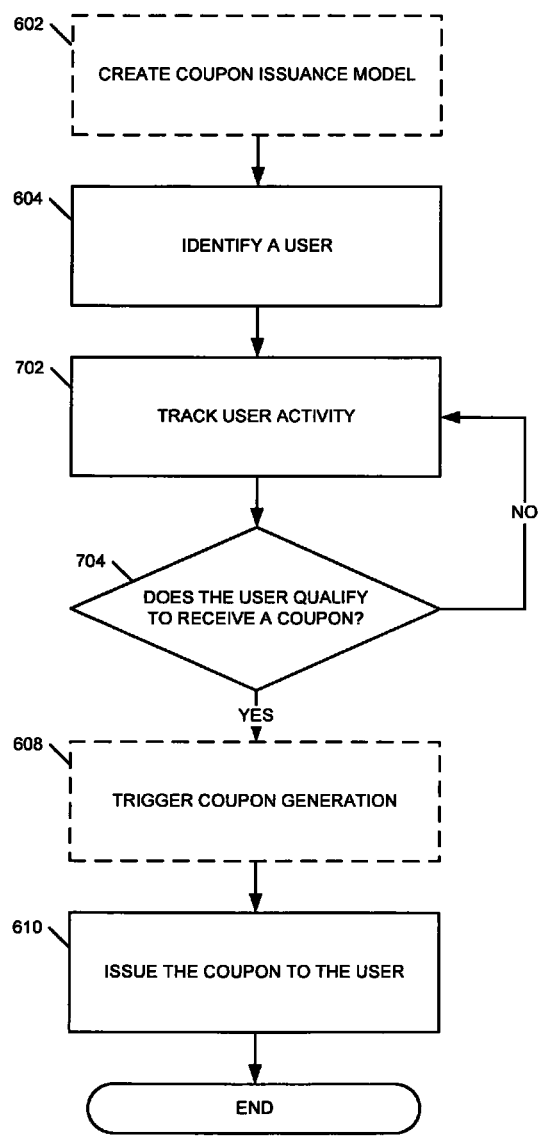
FIG. 7 is a flow chart illustrating an example method for dynamically issuing a coupon to a user within a network-base publication system.

FIG. 7 is a flow chart illustrating an example method 700 for dynamically issuing a coupon to a user within a networked system 102. The method 700 may be performed by any of the modules, logic, or components described herein. The method 700 includes some of the same basic operations described above in relation to FIG. 6 with the addition of an operation for actively tracking the user's activity on the networked system 102. Once the user has been identified at operation 604, the method 700 inserts operation 702 to track the user's activity. In an example, the user's activity is tracked using the real-time activity applications 234. In another example, the monitoring module 434 is employed for tracking real-time interactions between the user and the networked system 102. Next operation 704, in an example embodiment, determines whether to issue a coupon to the user based on activity information tracked in operation 702. In this example, the monitoring module 434 provides user activity data to the coupon infrastructure for determining whether to issue a coupon. The coupon rules engine 308 within the coupon infrastructure 304 can determine whether any of the user's current activity satisfies the applicable rules or coupon issuance model, if one applies to this coupon campaign. In some examples, the coupon rules engine 308 can use user profile data in addition to the real-time activity data provided by the monitoring module 434 in determining whether a coupon should issue. In this example, if the current user activity does not qualify the user for a coupon, the method 700 loops back to operation 702 and continues to track the user activity at least until the current user session ends.

Figure 8:
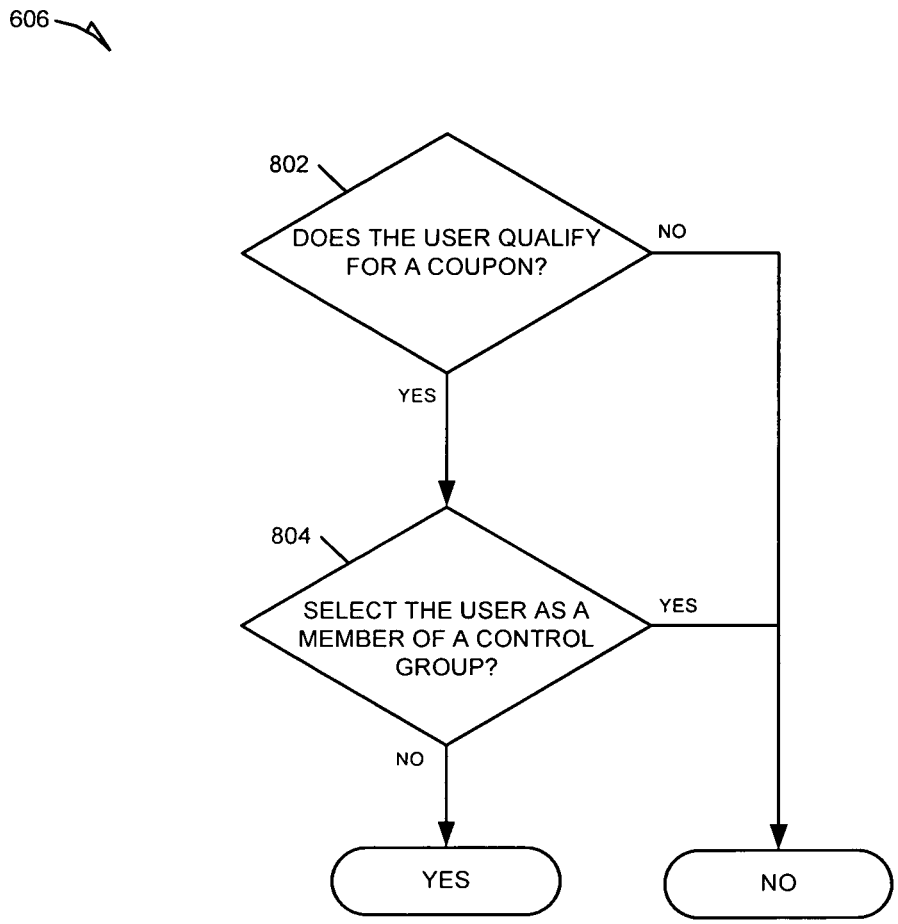
FIG. 8 is a flow chart illustrating an example method for dynamically determining whether to issue a coupon to a user.

FIG. 8 is a flow chart illustrating an example of methods 606 or 704 for dynamically determining whether to issue a coupon to a user. In an example embodiment, operations 606 or 704 can include the logic illustrated in FIG. 8. In this example, at operation 802 the coupon infrastructure 304 determines whether the user qualifies for a coupon. As discussed above relation to FIGS. 6 and 7, determining whether the user qualifies for a coupon can include locating the user on a pre-qualified list of users eligible to receive a coupon or determining if an applicable coupon issuance model is satisfied by the current conditions related to the user. If it is determined at operation 802 that the user does not qualify, the methods 600 or 700 will follow the negative path related to operation 606 or 704. In this example, if the user does qualify for a coupon, processing continues at operation 804 where the user may be selected as member of a control group. If the user is selected as a member of a control group, method 600 or 700 will follow the negative path related to operation 606 or 704. Where the user is selected as a member of the control group, the user will not be issued a coupon. Inhibiting the issuance of a coupon to an eligible user and placing that user into a control group allows either the publication system host or individual merchants (sellers) the ability to gauge the effectiveness of a coupon campaign. In certain example embodiments, once the user is part of a control group, the user's actions are logged for future comparison against the actions of those users who did receive a coupon. For example, control group comparison can provide some indication of how effective the coupon was in encouraging a user to make a purchase. An intended benefit of dynamically issuing coupons targeted to users actively browsing on the networked system 102 is to drive additional immediate purchases as a reaction to receiving the coupon. Unlike other methods of coupon delivery, dynamic on-site coupon issuance provides an immediate financial incentive while the user is actively engaged in the purchase process.

Figure 9:
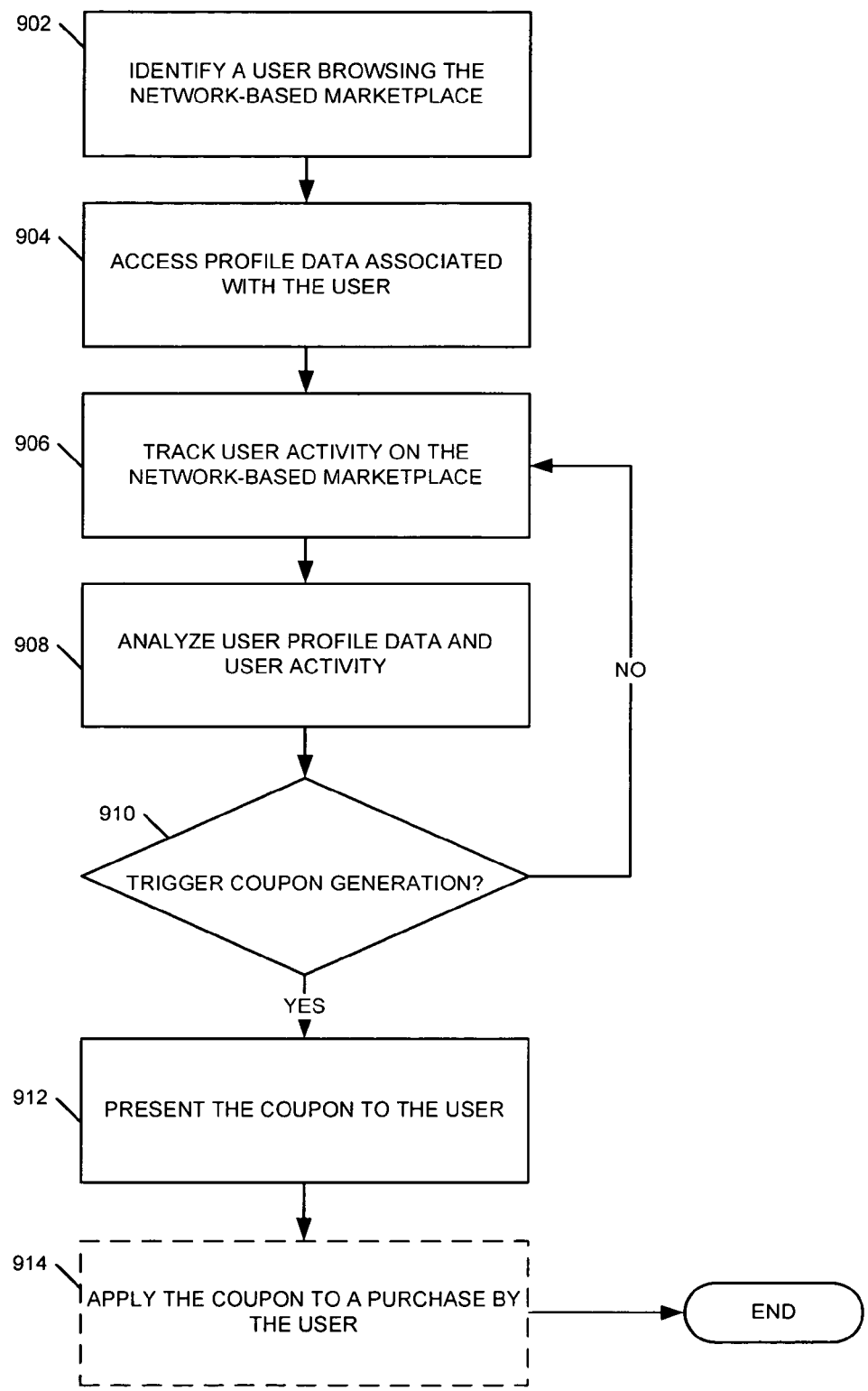
FIG. 9 is a flow chart illustrating an example method for dynamically issuing a coupon to a user during a current browsing session.

FIG. 9 is a flow chart illustrating an example method 900 for dynamically issuing a coupon to a user during a current browsing session on the networked system 102. The method 900 may be performed by any of the modules, logic, or components described herein. In an example embodiment, the method 900 commences at operation 902 identifying a user browsing the networked system 102 through the pages provided by the web server 116. In another example, the user can be browsing the network system 102 through a programmic interface provided by the API server 114. User identification on the networked system 102 is accomplished through authenticating the user against a stored user profile, for example using a username and password combination. In some embodiments, the username can uniquely identify the user externally to the networked system 102, for example an electronic mail address. In another embodiment, authentication can include a security device, such as a two-factor digital ID token (e.g., RSA SecurID from RSA Security of Bedford, Mass.). In yet another embodiment, the networked system 102 can use a tracking cookie (e.g., a HTTP cookie) to identify a particular user, providing a relatively lower level authentication of the user's credentials. The level of authentication employed can be dependent on the amount or nature of sensitive information retained within the networked system 102 regarding a particular user. In any of the described embodiments, the networked system 102 may not be able to ensure a user's identity beyond the authentication mechanisms in use. Once the user is identified, the method 900 continues at operation 904 by accessing profile data associated with the user. In some examples, the profile data can be accessed by the coupon rules engine 308 from the database 126.

In an example, the method 900 continues at operation 906 by tracking user activity on the networked system 102. In this example, the user activity can be tracked by the real-time activity applications 234, which can feed the captured data into the coupon infrastructure 304 for use in determining whether to issue a coupon to a user. In this example, when new user activity is detected by the real-time activity applications 234, the method 900 analyzes the user activity and the user profile data in relation to an applicable coupon issuance model, at operation 908. The results of the analysis, by the coupon rules engine 308, are used at operation 910 to trigger generation of a coupon for the user, if the necessary conditions are satisfied. For example, in some embodiments, the method 900 will trigger coupon generation if the real-time activity applications 234 detect that the user just lost an auction. In another example, method 900 will trigger coupon generation, at operation 910, if the user is detect making multiple bids on an auction listing. In other examples, coupon generation can be triggered by a purchase within a specified category, a purchase exceeding a certain dollar amount, viewing a certain item or category of items, or through a combination of detected user activities. In certain examples, the user's purchase history or frequency of visits to the networked system 102 are evaluated in determining whether to trigger coupon generation at operation 910. As described in relation to FIG. 6, some example embodiments utilize the monitoring module 434 to obtain the real-time user activity data.

At operation 910, in certain embodiments, if coupon generation is not triggered the method 900 loops back to operation 906 to continue to track user activity. In some examples, the method 900 will continue to track user activity until the user session is terminated. If coupon generation is triggered at operation 910, the method 900 continues to present the coupon to the user at operation 912. In certain examples, operation 912 can immediately present the coupon while the user is still browsing the network system 102. The coupon can be presented through the coupon widget 306, described in detail above.

Certain example embodiments may facilitate delivery of coupons or promotional information to a user browsing an online publication system, such as the networked system 102. Some example embodiments may also facilitate delivery of coupons or promotional information that is specifically targeted to the individual user browsing the online publication system. Additional example embodiments may facilitate redemption of coupons issued during a particular user-session through selection from a list of available coupons. In certain example embodiments, the publication system may be able to present all coupon received by a user that are still available for use during the checkout process. Yet other example embodiments may facilitate coordinated delivery of coupons and promotional information targeted at a specific user through multiple communication channels.

An example embodiment that facilitates delivery of coupons or promotional information to a user browsing an online publication system improves the usability of the system for the user. In certain publication systems, the user can search for items the user may wish to purchase. Enabling the publication system to issue a coupon or similar incentive while the user is actively searching for items the user may wish to purchase, improves the user experience and increases the likelihood the user will make a purchase. Providing a user with an immediate incentive to make a purchase may also reduce network traffic, as the user may reduce the amount of browsing of additional purchase options.

As discussed above, coupons are typically redeemable by anyone that receiving them and are typically delivered without explicit knowledge of the identity of the recipients. Allowing a seller or publication system to target specific users to receive coupon or promotional information can improve the usefulness of the publication system. For example, if a seller has excess inventory of a certain type of item and needs to crease sales of that item, it would be highly efficient to send a coupon to users already searching for that type of item, instead of sending out an anonymous coupon to a large group of users. Targeting the distribution of coupons may reduce network traffic and/or e-mail storage space requirements as the amount of junk e-mail can be reduced.

The typical user of a networked publication system may receive a large number of promotional offers and coupons through e-mail or other delivery mechanisms. When the user is ready to make a purchase, being presented with coupons available for use against a particular purchase prevents the user from needing to locate an application coupon. Thus, the usability of the publication system is improved and the amount of network traffic related to searching e-mail archives is reduced.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
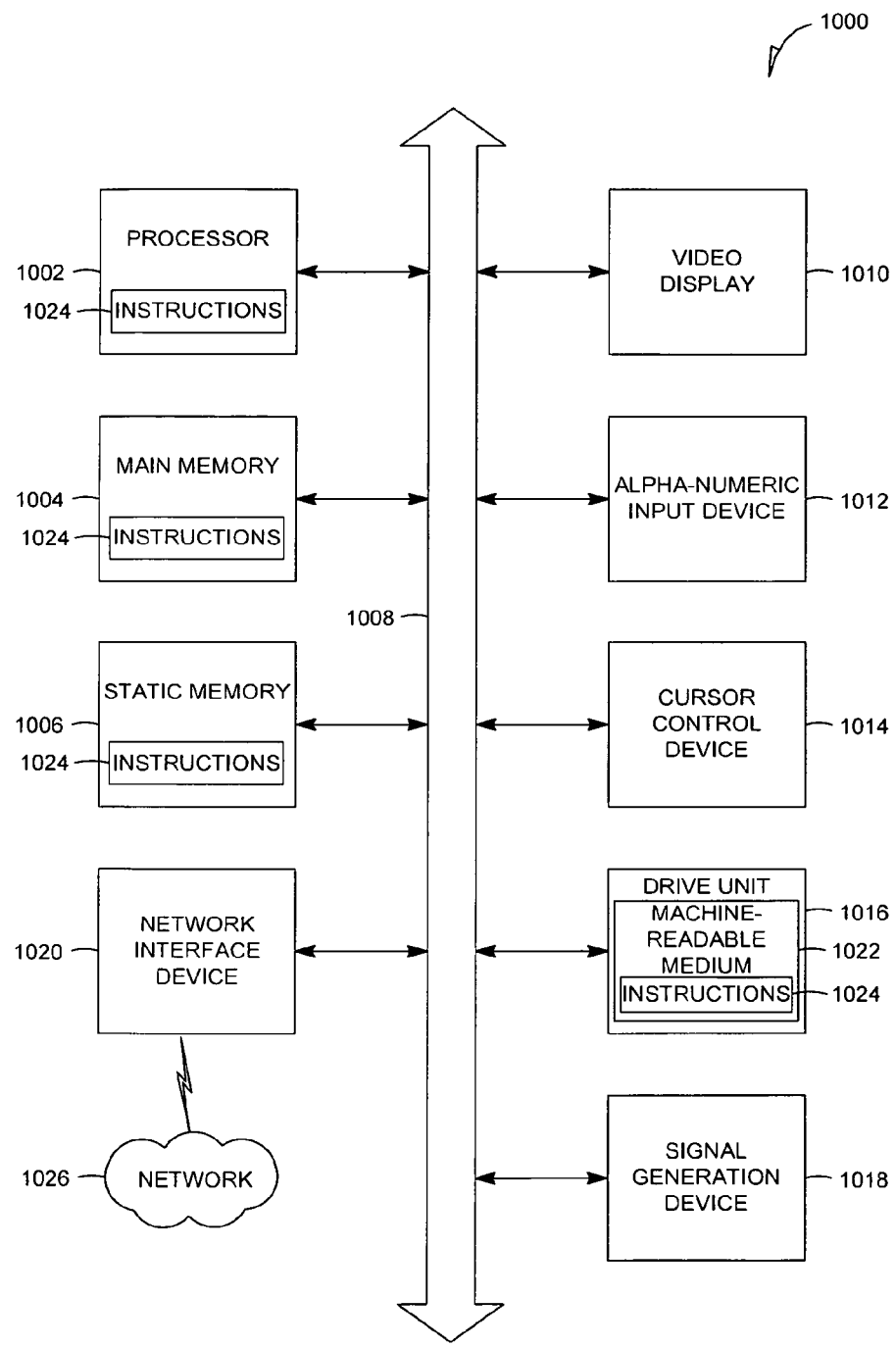
FIG. 10 is a diagrammatic representation of machine in the example form of a computer system within which a set of instructions for causing the machine to perform any one or more of the methodologies discussed herein, may be executed.

FIG. 10 is a block diagram of machine in the example form of a computer system 300 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system to dynamically issue coupons to a user on a network-based publication system have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of dynamically issuing coupons within a network-based system, the method comprising:

identifying, using one or more processors within the network-based system, a user accessing the network-based system over a network using a remote computer system;

establishing a network-based user session based on the user accessing the network-based system;

determining, using the one or more processors while the user is accessing the network-based system and during the user session, whether the user qualifies to receive a coupon by using at least one of profile data or activity data associated with the user;

dynamically issuing a coupon to the user, using the one or more processors while the user is accessing the network-based system and during the user session, based on the determination that the user qualifies to receive the coupon;

displaying, in response to issuing the coupon to the user, a representation of the coupon within a portion of a display generated by the network-based system, the display transmitted by the network-based system for reception by the remote computer system, the displaying occurring during the user session; and applying the coupon to a purchase by the user.

2. The method of claim 1, further comprising triggering coupon generation based on the determination that the user qualifies to receive the coupon.

3. The method of claim 1, wherein the profile data includes one or more of the following:
purchase history on the network-based system;
activity history on the network-based system;
demographic data; or
frequency of visits to the network-based system.

4. The method of claim wherein the activity data includes current activity on the network-based system.

5. The method of claim 1, wherein the determining whether the user qualifies to receive the coupon includes one or more of the following conditions:
that the user purchased an item from a specified category;
that the user purchased an item over a specified price;
that the user used a coupon to purchase an item;
that a specified number of previous purchases were not made using a coupon;
that the user has made less than a specified number of purchases within a specified number of days;
that the user has redeemed less than a specified number of coupons within a specified number of days;
that the user has an outstanding payment to a merchant on the network-based system; or
that the user has a current bid on an auction listing within the network-based system.

6. The method of claim 2, wherein the triggering coupon generation of the dynamically issued coupon creates a coupon that is unique to the user and is redeemable only by the user within the network-based system.

7. The method of claim 1, wherein the determining whether the user qualifies to receive the coupon includes:
selecting the user as a member of a control group, wherein the control group is used to compare purchase behavior to users that received the coupon to determine how effective the coupon was in encouraging a purchase; and
inhibiting, based on selection as a member of the control group, issuing of the coupon to the user.

8. The method of claim 7, further including tracking subsequent activity of the user on the network-based system as part of the control group.

9. The method of claim 1, wherein the determining whether the user qualifies to receive the coupon includes verifying that the user is on a list of users pre-qualified to receive the coupon; and wherein the list of users pre-qualified to receive a coupon is created using one or more of the following:
purchase history on the network-based system;
activity history on the network-based system;
demographic data; or
frequency of visits by the user to the network-based system.

10. A method to deliver instantaneous targeted coupons within a network-based system, the method comprising:
identifying, using one or more processors within the network-based system, a user interaction session between a user and the network-based system;
accessing profile data associated with the user;
tracking, using the one or more processors, activity of the user during the user interaction session;
analyzing, using the one or more processors, the profile data associated with the user and the activity of the user interacting with the network-based system;
triggering, using the one or more processors, generation of a unique coupon redeemable only by the user based on results of analyzing the profile data associated with the user and the activity of the user interacting with the network-based system; and
presenting, using the one or more processors, the unique coupon to the user during the user interaction session, the presenting including transmitting at least a portion of a display for reception by the user.

11. The method of claim 10, further including redeeming the unique coupon during a purchase by the user on the network-based system.

12. The method of claim 10, wherein the network-based system includes network-based auction listings.

13. The method of claim 11, wherein the triggering of the generation occurs based on the user losing an auction.

14. The method of claim 11, wherein the triggering of the generation occurs based on the user making multiple bids on a single auction listing.

15. The method of claim 10, wherein the triggering of the generation occurs based on the user purchasing a specified product.

16. The method of claim 10, wherein the triggering of the generation occurs based on the user purchasing a product within a specified category.

17. The method of claim 10, wherein the triggering of the generation occurs based on the user viewing a listing on the network-based system meeting a specified criterion.

18. The method of claim 10, wherein the analyzing of the profile data associated with the user and the activity of the user interacting with the network-based system includes evaluation of a frequency of visits by the user to the network-based system.

19. The method of claim 10, wherein the analyzing of the profile data associated with the user and the activity of the user interacting with the network-based system includes evaluation of purchase history associated with the user.

20. The method of claim 10, wherein the analyzing of the profile data associated with the user and the activity of the user interacting with the network-based system includes evaluation of items viewed within the network-based system during the current user interaction session.

21. A computer-implemented system for issuing targeted coupons within a network-based system, the system comprising:
a processor-implemented targeting module to create a model for controlling coupon generation;
a processor-implemented coupon rules engine to determine whether a user accessing the network-based system qualifies to receive a coupon based at least in part on application of the model created by the targeting module;

a processor-implemented coupon generation engine to generate a coupon during a session initiated when the user began accessing the network-based system and based on the coupon rules engine determining that the user qualifies to receive a coupon;

a coupon widget to present the coupon to the user while the user is accessing the network-based system and during the session; and a processor-implemented checkout module to apply the coupon to a purchase by the user.

22. The computer-implemented system of claim 21, further comprising a database to store at least one of user profile data or user activity data; and wherein the coupon rules engine is to access the database to apply at least one of user profile data or user activity data associated with the user against the model created by the targeting module to determine whether the user should receive a coupon.

23. The computer-implemented system of claim 22, wherein the user profile data, stored in the database, includes one or more of the following:

purchase history on the network-based system;
activity history on the network-based system;
demographic data; or
frequency of visits to the network-based system.

24. The computer-implemented system of claim 21, further comprising a processor-implemented monitoring module to monitor activity of the user while accessing the network-based system; and wherein the coupon rules engine is to use the monitored activity to determine whether the user accessing the network-based system qualifies to receive a coupon.

25. The computer-implemented system of claim 21, wherein the targeting module is to select one or more of the following conditions to create the model for determining when to generate a coupon:

the user purchased an item from a specified category;
the user purchased an item over a specified price;
the user used a coupon to purchase an item;
a specified number of previous purchases were not made using a coupon;
the user has made less than a specified number of purchases within a specified number of days;
the user has redeemed less than a specified number of coupons within a specified number of days;
the user has any outstanding payments to merchants on the network-based system; or
the user has any live bids on auction listings within the network-based system.

26. The computer-implemented system of claim 21, wherein the coupon generation engine is further to generate a unique coupon redeemable only by the user.

27. The computer-implemented system of claim 21, wherein the coupon rules engine is further to:

select the user as a member of a control group, wherein the control group is used to compare purchase behavior to users that received the coupon to determine how effective the coupon was in encouraging a purchase; and inhibit the coupon generation engine from generating a coupon for the user.

28. The computer-implemented system of claim 27, further including an application server to track subsequent activity by the user on the network-based system for a specified time period and log the activity as part of the control group.

29. The computer-implemented system of claim 21, further including a database to store information on all registered users of the network-based system;

wherein the targeting module is further to create a list of users pre-qualified to receive a coupon; and wherein the coupon rules engine is further to validate that the user is on the list of users pre-qualified to receive a coupon in determining whether the user should receive a coupon.

30. The computer-implemented system of claim 29, wherein the targeting module is to create the list of users pre-qualified to receive a coupon by using one or more of the following, purchase history on the network-based system;
activity history on the network-based system;
demographic data; or
frequency of visits to the network-based system.

* * * * *

UNITED STATES PATENT AND TRADEMARK OFFICE
CERTIFICATE OF CORRECTION

PATENT NO. : 9,519,908 B2  
APPLICATION NO. : 12/610057  
DATED : December 13, 2016  
INVENTOR(S) : Malik et al.

Page 1 of 1

It is certified that error appears in the above-identified patent and that said Letters Patent is hereby corrected as shown below:

In Column 25, Line 30, in Claim 4, delete "claim" and insert --claim 1,--, therefor Signed and Sealed this  
Eighth Day of May, 2018

Andrei Iancu  
*Director of the United States Patent and Trademark Office*